United States Patent [19]

Fanning et al.

[11] Patent Number: 5,420,470
[45] Date of Patent: May 30, 1995

[54] ELECTROMAGNETIC PUMP STATOR FRAME HAVING POWER CROSSOVER STRUTS

[75] Inventors: Alan W. Fanning, San Jose; Eugene E. Olich, Aptos, both of Calif.

[73] Assignee: General Electric Company, San Jose, Calif.

[21] Appl. No.: 4,013

[22] Filed: Jan. 15, 1993

[51] Int. Cl.⁶ .................... H02K 11/00; H02K 1/12; H02K 3/46
[52] U.S. Cl. .................... 310/71; 310/259; 310/260
[58] Field of Search .............. 310/71, 11, 258, 259, 310/260, 270, 266

[56] References Cited

U.S. PATENT DOCUMENTS

| | | | |
|---|---|---|---|
| 3,760,139 | 9/1973 | Porter, Jr. .................... | 310/11 X |
| 4,508,677 | 4/1985 | Craig et al. .................... | 376/174 |
| 4,859,885 | 8/1989 | Kliman et al. .................... | 310/11 |
| 4,869,647 | 9/1989 | Aoyama et al. .................... | 310/11 X |
| 4,882,514 | 11/1989 | Brynsvold et al. .................... | 310/208 |
| 5,263,068 | 11/1993 | Dahl et al. .................... | 310/11 X |

OTHER PUBLICATIONS

Patent Abstracts of Japan, vol. 12, No. 80 (E-590) Mar. 12, 1988 & JP-A-62-217853 (Toshiba) Sep. 25, 1987.

*Primary Examiner*—Steven L. Stephan
*Assistant Examiner*—E. To
*Attorney, Agent, or Firm*—J. E. McGinness

[57] ABSTRACT

A stator frame for an electromagnetic pump includes a casing joined to a hub by a plurality of circumferentially spaced apart struts. At least one electrically insulated power crossover lead extends through the hub, through a crossover one of the struts, and through the casing for carrying electrical current therethrough.

12 Claims, 3 Drawing Sheets

ELECTROMAGNETIC PUMP STATOR FRAME HAVING POWER CROSSOVER STRUTS

The U.S. Government has rights in this invention in accordance with Contract No. DE-AC03-89SF17445 awarded by the Department of the Energy.

The present invention relates generally to electromagnetic pumps, and, more specifically, to a stator frame therein for routing electrical power leads therethrough.

BACKGROUND OF THE INVENTION

Advanced nuclear reactors being developed include liquid metal nuclear reactors which use liquid sodium, for example, for cooling the reactor core thereof. In order to circulate the liquid sodium through the reactor core, electromagnetic pumps are used which magnetically pump the liquid sodium therethrough.

More specifically, annular linear induction, or electromagnetic, pumps (ALIP) are known to include annular electrical coils and lamination rings which are stacked together on a common longitudinal centerline axis and have an annular duct extending therethrough. Electrical current provided to the coils induces magnetic flux for pumping the liquid metal through the duct. The coils may be arranged in a singular tubular configuration conventionally known as a single stator electromagnetic pump, or two groups of coils may be used, with the first group being configured in one tubular configuration as a radially inner stator, and the second group configured in another tubular configuration as a radially outer stator spaced radially outwardly from the inner stator to define a concentric annular flow duct therebetween in which the liquid sodium is propelled linearly through the electromagnetic pump parallel to its longitudinal centerline axis.

The liquid sodium is pumped axially through the pump from its bottom inlet to its top outlet, or discharge plenum, wherein it turns radially outwardly away from the centerline axis of the pump. The stator coils of the pump are provided with electrical current through power leads which, in a single stator ALIP, are typically channeled downwardly through the discharge plenum and into the stator. In order to protect the power leads from the liquid sodium in the discharge plenum, suitable conduits, including bellows, surround the power leads and are therefore subject to flow induced vibration and provide a potential sodium leakage path in the event of damage thereto.

Similarly, the power leads to the outer stator of a double stator ALIP may also be disposed in protective conduits, including bellows, where the power leads pass through the discharge plenum. In the double stator ALIP design, however, the power leads to the inner stator may be routed directly from a junction box extending upwardly from the inner stator along the pump centerline axis and disposed radially inside the discharge plenum.

Accordingly, the inner stator power leads are inherently protected by the junction box and not exposed to the liquid sodium, whereas the outer stator power leads must still be protected by separate conduits and bellows, the elimination of which is desired.

SUMMARY OF THE INVENTION

A stator frame for an electromagnetic pump includes a casing joined to a hub by a plurality of circumferentially spaced apart struts. At least one electrically insulated power crossover lead extends through the hub, through a crossover one of the struts, and through the casing for carrying electrical current therethrough.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
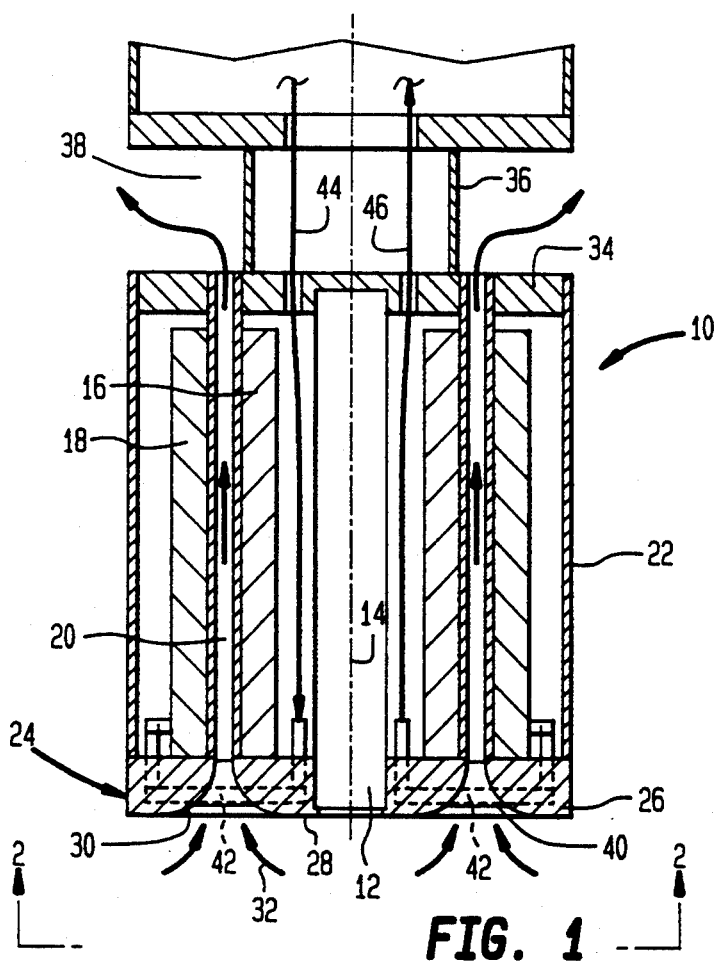
FIG. 1 is a longitudinal sectional view of an exemplary double stator electromagnetic pump having an improved stator frame including power crossover leads in accordance with one embodiment of the present invention.

Illustrated schematically in FIG. 1 is an exemplary double stator, annular linear induction, or electromagnetic, pump (ALIP) 10 configured for use in a liquid metal nuclear reactor (not shown). The pump 10 includes a central structural annular or cylindrical core 12 disposed coaxially about an axial, or longitudinal centerline axis 14. An annular, radially inner electrical stator 16 surrounds the core 12 and is disposed coaxially therewith, and an annular, radially outer electrical stator 18 is spaced radially outwardly from the inner stator 16 and is disposed coaxially therewith for defining an annular flow duct 20 therebetween. A cylindrical housing 22 surrounds the outer stator 18 and extends longitudinally from an inlet end to an outlet end of the pump 10.

Figure 2:
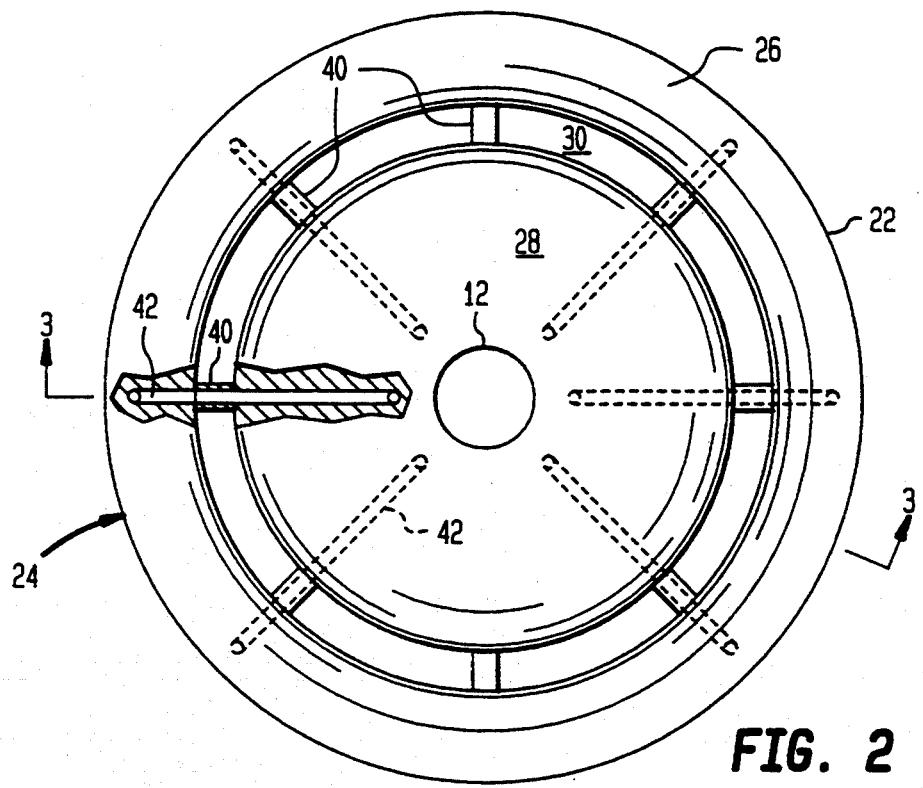
FIG. 2 is a partly sectional end view of the stator frame including the power crossover leads at the inlet end of the pump illustrated in FIG. 1 and taken along line 2—2.

More specifically, the pump 10 includes a stator baseplate or frame 24 at its inlet end in accordance with the present invention. The frame 24 as shown in FIGS. 1 and 2 includes an annular, radially outer rim or casing 26 disposed coaxially with the centerline axis 14, and an annular, radially inner hub 28 disposed coaxially and concentrically with the outer casing 26 about the centerline axis 14 and spaced radially inwardly from the casing 26 to define an annular bellmouthed inlet channel 30 therebetween for receiving a liquid metal 32 such as liquid sodium for flow upwardly through the flow duct 20 and through a second annular frame 34 at the outlet end of the pump 10.

A conventional annular junction casing or box 36 extends coaxially with the second frame 34, and is disposed radially inwardly of the flow duct 20 for allowing the liquid metal 32 to be discharged from the flow duct 20 and to flow radially outwardly from the junction box 36 through an annular outlet 38 disposed at the top of the housing 22 above the inner and outer stators 16, 18. In conventional operation, electrical current is suitably provided to both the inner and outer stators 16, 18 for generating a magnetic flux to propel the liquid metal 32 upwardly or linearly from the inlet channel 30 in frame 24, through the flow duct 20 and out the outlet 38 in a conventionally known manner.

In accordance with the present invention, electrical power is provided to the outer stator 18 through the junction box 36 without requiring conventional conduits or bellows extending axially upwardly from the outer stator 18, through the frame 34, and through the outlet 38 which would be subject to flow of the liquid metal 32 thereover. Electrical power is conventionally provided to the inner stator 16 also through the junction box 36, which is not the subject of the present invention.

More specifically, in this exemplary embodiment of the pump 10, each of the inner and outer stators 16, 18 includes conventional electrical coils configured for receiving threephase electrical power in a conventional manner. Accordingly, each of the stators 16, 18 includes three input leads and three respective output leads for carrying the three-phase current therethrough. The inner stator 16 is conventionally provided with three-phase power through the junction box 36 and is, therefore, not further described. However, the outer stator 18 utilizes the frame 24 at the inlet end, for example, of the pump 10 for carrying power thereto from the junction box 36 without requiring passage through the outlet 38.

As illustrated in FIGS. 1 and 2, the frame 24 includes a plurality of circumferentially spaced apart spokes or struts 40 extending radially between the casing 26 and the hub 28 and through the inlet channel 30. The struts 40 are fixedly joined to the casing 26 and the hub 28 and may be formed integrally therewith such as in a common casting. At least one electrically insulated power crossover cable or lead 42 extends through the hub 28, through one of the struts 40, which may alternatively be referred to as a crossover strut 40, and through the casing 26 for carrying electrical current therethrough. Electrical power is initially carried in a conventional input lead 44 as shown in FIG. 1 downwardly through the junction box 36 and between the core 12 and the inner stator 16, for example, to the frame 24. For the three-phase outer stator 18, three of the input leads 44 are provided. And, three corresponding output leads 46 extend from the frame 24 upwardly between the core 12 and the inner stator 16, for example, through the junction box 36, and upwardly to a conventional power supply (not shown).

As shown in FIG. 2, the frame 24 includes at least six struts 40, with eight struts 40 being shown, for use as respective crossover struts for respectively carrying six crossover leads 42 therein. The six crossover leads 42 are electrically joined to respective ones of the three input and three output leads 44, 46 for carrying electrical current to and from the outer stator 18 through the frame 24 in accordance with the present invention.

Figure 3:
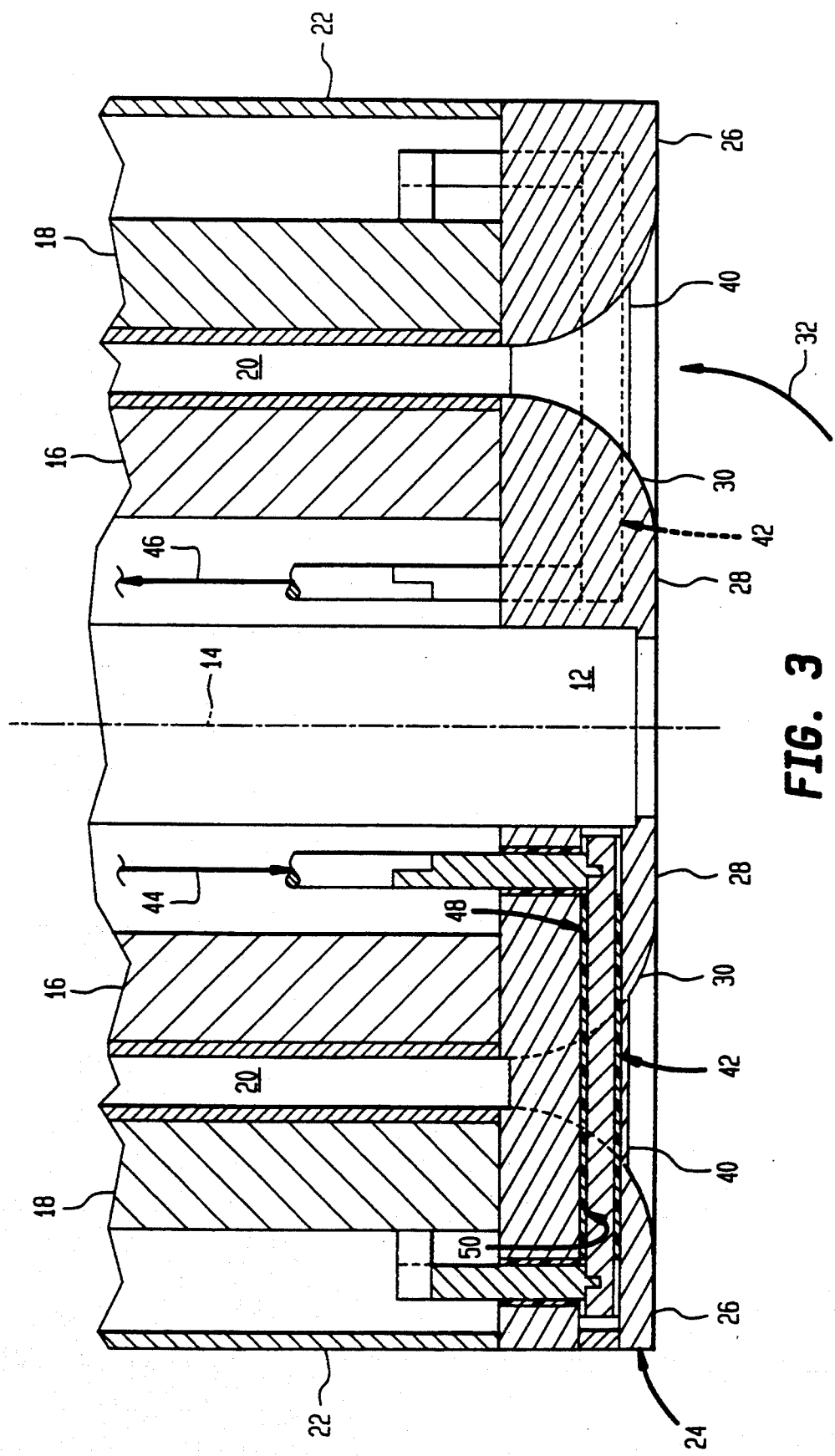
FIG. 3 is a longitudinal sectional view of the pump inlet end including the stator frame illustrated in FIG. 2 taken along line 3—3.

FIG. 3 illustrates in more particularity an exemplary one of the crossover leads 42, with all the crossover leads 42 being identical in this exemplary embodiment. On the left side of FIG. 3, the crossover lead 42 carries current from one of the three input leads 44 axially downwardly into the hub 28; then radially through a respective strut 40 to the casing 26; and then axially upwardly into the space between the housing 22 and the outer stator 18 wherein it is conventionally electrically joined to the outer stator 18. On the right side of FIG. 3, another crossover lead 42 is identically configured for providing a return current path from the outer stator 18 and through the frame 24 to a respective output lead 46. In this way, the crossover leads 42 extend through respective frame struts 40 and are thereby, protected from the liquid metal 32 channeled through the flow duct 20.

Each of the crossover leads 42 preferably is a discrete conductor which is disposed through a respective crossover passage 48 extending through the hub 28, the crossover strut 40, and the casing 26. Since the frame 24 in an exemplary embodiment is an electrically conducting metal member, and the crossover leads 42 are electrical conductors, each of the crossover passages 48 preferably includes a tubular electrical insulator 50 therein for receiving the crossover lead 42 and electrically insulating the crossover lead 42 from the hub 28, the crossover strut 40, and the casing 26.

Figure 4:
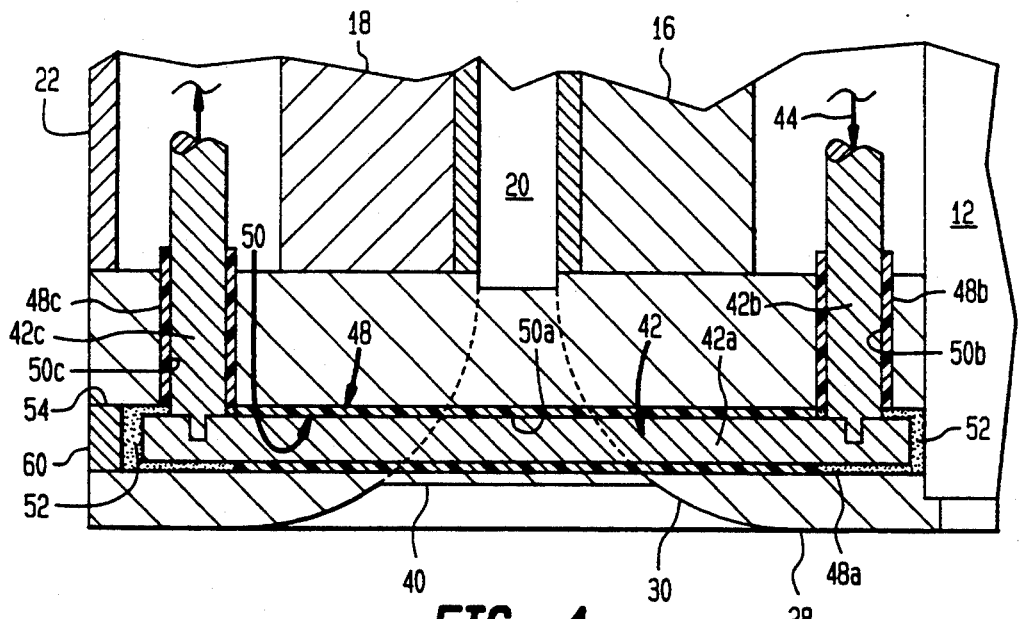
FIG. 4 is an enlarged longitudinal sectional view of a portion of the stator frame illustrated in FIG. 3 showing in more particularity an exemplary one of the power crossover leads having three joined together conductors surrounded by tubular electrical insulation bushings.

An exemplary one of the crossover leads 42 is shown in more particularity in FIG. 4 as a U-shaped assembly of three conductors in a complementary U-shaped crossover passage 48 having three portions, Each crossover passage 48 preferably includes a straight first, or center, channel 48a extending radially from the hub 28 and through the crossover strut 40 into the casing 26, and may be integrally formed during the casting process of the frame 24, or may be conventionally drilled completely radially through the frame 24. The crossover passage 48 also includes a second, or hub, channel 48b extending axially upwardly and perpendicularly from the radially inner end of the center channel 48a to an axially inside surface of the hub 28 adjacent the inner stator 16. The crossover passage 48 includes a third, or casing, channel 48c extending axially upwardly and perpendicularly from the radially outer end of the center channel 48a to the axially inside surface of the casing 26 adjacent the outer stator 18 on the same axial side of the frame 24 as that of the hub channel 48b. In this way, the crossover passage 48 has a generally U-shape for carrying the crossover lead 42 from inside the inner stator 16 and radially through the frame 24 to outside the outer stator 18.

Correspondingly, the crossover lead 42 is a three-piece member including a straight first, or center, conductor 42a extending through a portion of the center channel 48a; a second, or hub, conductor 42b extending axially through the hub channel 48b and fixedly and electrically joined to the inner end of the center conductor 42a; and a third, or casing, conductor 42c extending through the casing channel 48c arid fixedly and electrically joined to the outer end of the center conductor 42a.

Also in the preferred embodiment of the present invention, the electrical insulator 50 is a three-part member including a first, or center, bushing 50a surrounding the center conductor 42a in the center channel 48a and extending radially between the hub conductor 42b and the casing conductor 42c. The insulator 50 also includes a second, or hub, bushing 50b surrounding the hub conductor 42b in the hub channel 48b. The insulator 50 also includes a third, or casing, bushing 50c surrounding the casing conductor 42c in the casing channel 48c.

The crossover leads 42 are preferably copper, and the electrical insulator 50 is preferably in the form of conventional ceramic bushings for electrically insulating the crossover lead 42 from the frame 24 itself. The insulator bushings 50a, 50b, 50c provide a suitably close fit, subject to conventional manufacturing tolerances, surrounding the respective conductors 42a, 42b, 42c and within the respective channels 48a, 48b, 48c. Since the bushings 50b and 50c are disposed perpendicularly to the center bushing 50a in the U-shaped configuration, the radially outer and inner ends of the center conductor 42a are not directly insulated in this exemplary configuration. Accordingly, a conventional ceramic potting compound or cement 52 is disposed in both radially outer and inner ends of the center channel 48a and abuts the respective ends of the bushings 50a, 50b, and 50c for fully electrically insulating the crossover lead 42 from the frame 24.

As shown in FIG. 4, the center channel 48a preferably extends completely radially through the frame 24 from the casing 26 to the hub 28 and includes an inlet or access port 54 in the perimeter of the casing 26 sized for receiving both the center conductor 42a and the center bushing 50a during the assembly process.

Figure 5:
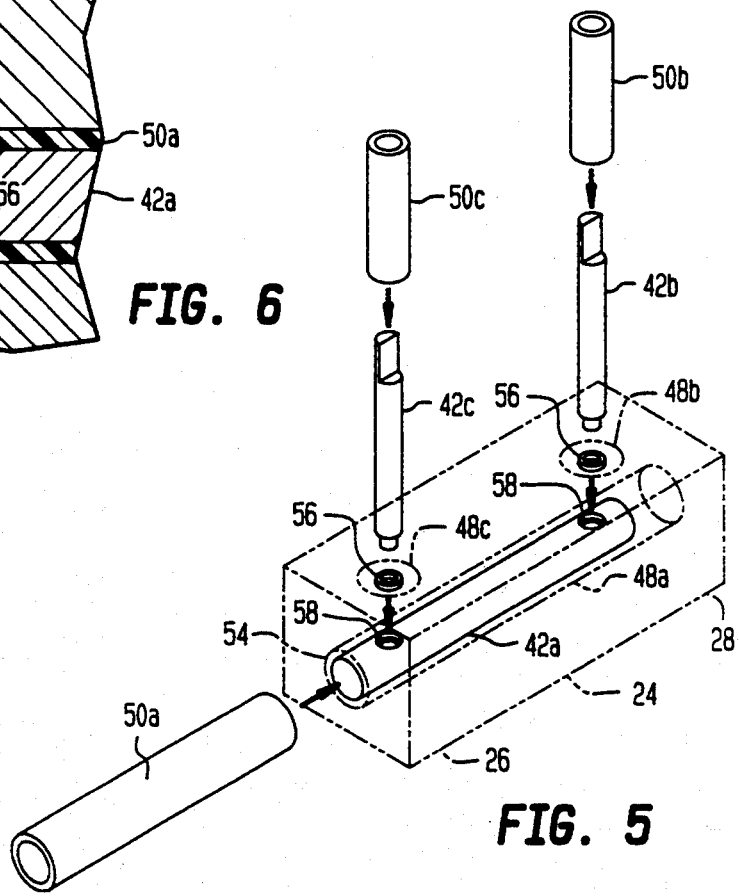
FIG. 5 is an exploded view of the three joined together conductors surrounded by tubular electrical insulation bushings of the crossover lead illustrated in FIG. 4.

More specifically, FIG. 5 illustrates an exploded view of the crossover lead 42 and the electrical insulator 50 for assembly into the frame 24. In this exemplary configuration, the center conductor 42a and the center bushing 50a are inserted into the center channel 48a through the access port 54 in any suitable order, or together if desired, for suitably positioning these parts within the center channel 48a. The hub and casing conductors 42b and 42c are then inserted downwardly through the respective hub and casing channels 48b and 48c into position in abutting contact with the center conductor 48a. Conventional brazing material 56 in the exemplary initial form of washers are positioned between the inner ends of the conductors 42b, 42c and the center conductor 42a. The hub and casing bushings 50b and 50c are then inserted over the conductors 42b and 42c into the respective hub and casing channels 48b and 48c to center and support the conductors 42b, 42c. This process is repeated for all of the desired crossover leads 42 and then the entire frame 24 is placed in a conventional furnace for heating the crossover leads 42 and the brazing material 56 to melt the brazing material 56 for effecting furnace brazing of the ends of the hub and casing conductors 42b and 42c to the center conductor 42a. Upon cooling of the frame 24, the hub and casing conductors 42b and 42c are, therefore, fixedly and electrically joined to the center conductor 42a by the brazing material 56.

Figure 6:
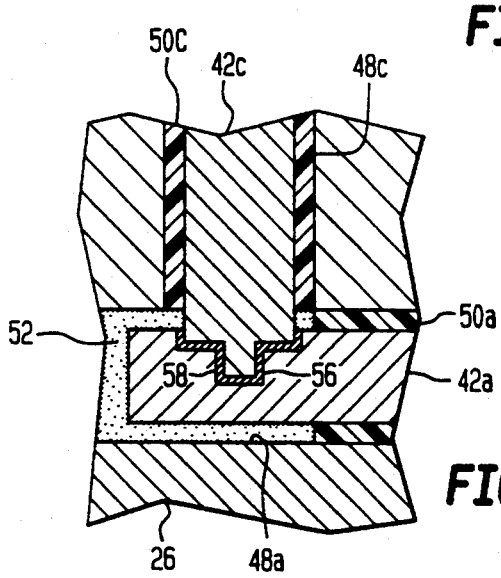
FIG. 6 is an enlarged sectional view of an exemplary joint between two of the crossover lead conductors illustrated in FIG. 4.

As shown in FIGS. 5 and 6, the hub conductor 42b and the casing conductor 42c have distal ends in the exemplary form of tenons, and the center conductor 42a includes a pair of mortises 58 for receiving respective ones of the hub and casing conductor tenons. The brazing material washers 56 may be initially sized to fit over the tenons and inside the mortises 58 prior to being melted. Upon melting of the brazing material 56, the brazing material 56 completely fills the joint between the conductor tenons and the mortises 58 by capillary action for providing a strong mechanical and electrical joint for carrying electrical current through the conductors 42a, 42b, and 42c.

As shown in FIG. 4, the potting cement 52 may be inserted into the center channel 48a from either end if accessible, or the hub and casing bushings 48b and 42c may be temporarily removed for allowing the potting cement 52 to be injected into the hub and casing channels 48b and 48c prior to reinstallation of the bushings 50b and 50c which are also, thereby, cemented into the respective channels 48b and 48c. A suitable metal plug 60 may then be conventionally welded in the access port 54 to complete the final assembly of the frame 24. The radially inner end of the center channel 48a may either be a blind hole requiring no further enclosing structure; or may similarly use another one of the plugs 60 where space permits assembly thereof; or in the embodiment illustrated in FIG. 4, the core 12 itself provides closing of the inner end of the center channel 48a.

Accordingly, the power leads 44 and 46 for the outer stator 18 may be routed from the junction box 36 above the inner stator 16, axially downwardly along the inner stator 16, radially through the crossover struts 40, and upwardly into the outer stator 18. In this way, conventional conduits and bellows for carrying power leads through the pump outlet 38 are not required, and the flow-induced vibration thereof and possibility of sodium leaking therein are eliminated. Of course, the crossover leads 42 could, alternatively, be suitably configured in the second frame 34 if desired, or at any other suitable position between the pump inlet channel 30 and its outlet 38 as desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention. For example, although the invention has been described with respect to a three-phase outer stator 18 joined in series with the inner stator 16 and having six-crossover leads 42, the outer stator 18 can have any other type of electrical configuration including being joined in parallel with the inner stator 16 in a conventional delta configuration requiring only three crossover leads 42.

Accordingly, what is desired to be secured by Letters Patent of the United States is the invention as defined and differentiated in the following claims:

We claim:

1. A stator frame for a dual-stator electromagnetic pump, comprising:
    an annular, radially outer casing penetrated by a first portion of a crossover passage;
    an annular, radially inner hub penetrated by a second portion of said crossover passage and disposed coaxially with said casing and spaced radially inwardly therefrom to define an annular inlet channel therebetween;
    a plurality of circumferentially spaced struts joined at its respective ends to said casing and said hub and extending across said inlet channel, one of said struts being penetrated by a third portion of said crossover passage; and
    at least one electrically insulated power crossover lead disposed within said crossover passage for carrying electrical current therethrough.

2. A stator frame according to claim 1 wherein:

said crossover passage has a tubular electrical insulator therein for receiving said crossover lead and electrically insulating said crossover lead from said hub, a crossover one of said strut, and said casing.

3. A stator frame for an electromagnetic pump comprising:
an annular, radially outer casing;
an annular, radially inner hub disposed coaxially with said casing and spaced radially inwardly therefrom to define an annular inlet channel therebetween;
a plurality of circumferentially spaced struts extending radially between said casing and said hub and through said inlet channel;
at least one electrically insulated power crossover lead extending through said hub, through a crossover one of said struts, and through said casing for carrying electrical current therethrough;
a crossover passage extending through said hub, said crossover strut, and said casing for receiving said crossover lead therein; and
said crossover passage having a tubular electrical insulator therein for receiving said crossover lead and electrically insulating said crossover lead from said hub, said crossover strut, and said casing, wherein:
said crossover passage includes a center channel extending radially from said hub and through said crossover strut into said casing; a hub channel extending perpendicularly from an inner end of said center channel to an inside surface of said hub; and a casing channel extending perpendicularly from an outer end of said center channel to an inside surface of said casing;
said crossover lead includes a center conductor extending through said center channel; a hub conductor extending through said hub channel and electrically joined to said center conductor; and a casing conductor extending through said casing channel and electrically joined to said center conductor; and
said electrical insulator includes a center bushing surrounding said center conductor in said center channel and extending radially between said hub conductor and said casing conductor; a hub bushing surrounding said hub conductor in said hub channel; and a casing bushing surrounding said casing conductor in said casing channel.

4. A stator frame according to claim 3 wherein said center channel includes an access port in a perimeter of said casing sized for receiving both said center conductor and said center bushing.

5. A stator frame according to claim 3 wherein said casing conductor and said hub conductor are fixedly and electrically joined to said center conductor by brazing material.

6. A stator frame according to claim 5 wherein said casing conductor and said hub conductor have distal ends in a form of tenons, and said center conductor includes a pair of mortises for receiving respective ones of said hub and casing conductor tenons.

7. A stator frame according to claim 3 wherein said electromagnetic pump includes a three-phase electrical stator having three input leads and three output leads, and said frame includes six of said crossover struts and six of said crossover leads therein, respectively, and each of said crossover leads is electrically joinable to a respective one of said three input and output leads for carrying electrical current to and from said electrical stator.

8. A stator frame in accordance with claim 7 in combination with a double stator electromagnetic pump wherein said electrical stator is a radially outer stator disposed radially outwardly of a radially inner stator and having an annular flow duct disposed radially therebetween and in flow communication with said frame inlet channel.

9. A dual-stator electromagnetic pump, comprising:
an inner stator and an outer stator concentrically arranged with an annular flow duct therebetween, said annular flow duct having an annular channel therein; and
a support frame for securing said inner and outer stators in said concentric arrangement with said flow duct therebetween, said support frame having an inlet channel in flow communication with an inlet end of said annular channel and an outlet channel in flow communication with an outlet end of said annular channel, said inlet channel, said annular channel and said outlet channel forming a pump flow channel, said support frame comprising at least one strut which extends across said pump flow channel, said strut having a passage extending therethrough; and
an electrically insulated power cable for carrying electrical current arranged inside and passing through said passage in said strut.

10. A dual-stator electromagnetic pump, comprising:
an annular inner stator and an annular outer stator concentrically arranged with an annular flow duct therebetween, said annular flow duct having an annular channel therein and said annular inner stator having a central opening;
a support frame for securing said inner and outer stators in said concentric arrangement with said flow duct therebetween, said support frame having an inlet channel in flow communication with an inlet end of said annular channel and an outlet channel in flow communication with an outlet end of said annular channel, said inlet channel, said annular channel and said outlet channel forming a pump flow channel, said support frame comprising strut means extending across said pump flow channel, said strut means comprising passage means extending therethrough;
a power input lead passing through said central opening;
a power output lead passing through said central opening;
electrically insulated power cable means for carrying electrical current arranged inside and passing through said passage means in said strut means, wherein said power cable means comprises a first power cable connecting said power input lead to said outer stator and a second power cable connecting said power output lead to said outer stator.

11. The dual-stator electromagnetic pump as defined in claim 10, wherein said support frame further comprises a central core structural member extending through said central opening of said inner stator with space separating said central core structural member and said inner stator, said power input and output leads passing through said central opening.

12. The dual-stator electromagnetic pump as defined in claim 10, wherein said outlet channel of said support frame has a radius greater than a predetermined radius, further comprising a junction box arranged on and outside a portion of said support frame in which said outlet channel is formed, said junction box having a radius less than said predetermined radius and being arranged coaxial with said outlet channel, said power input and output leads being connected to a source of electrical power through said junction box.

* * * * *